United States Patent Office 3,168,874
Patented Feb. 9, 1965

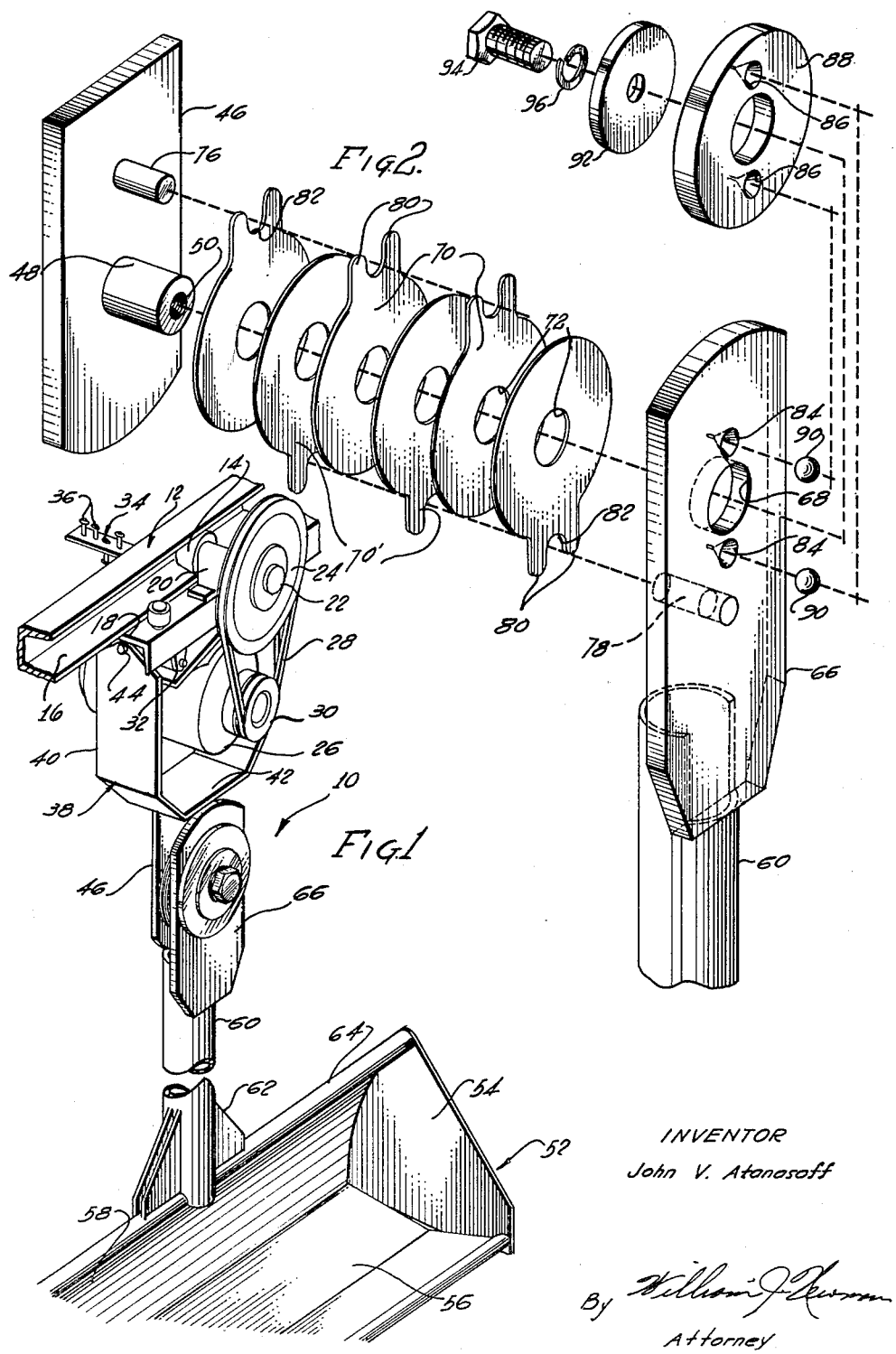

3,168,874
DAMPER MECHANISM
John V. Atanasoff, Frederick, Md., assignor, by mesne assignments, to Cybernetics Inc., Frederick, Md., a corporation of Maryland
Filed Sept. 25, 1962, Ser. No. 225,985
11 Claims. (Cl. 104—89)

This invention relates to a high-speed, sortation conveyor system employing a plurality of traveling load carriers of the self-powered, self-controlled type with a depending, pivoted load-support platform carried thereby and more particularly to an improved, mechanically operated, friction dampening mechanism to dampen oscillations of the platform as the load is moved along the conveyor system.

In conveyor systems used to transport material from station to station and to simultaneously sort the material carried thereby, the number of loading and delivery stations and the number of tracks or guide rails between respective stations are generally controlled by the physical size and configuration of the load carriers. A trend has developed towards the inclusion of the drive and control means in a unitary carrier assembly whereby the complete unit is moved through its own power and control means from one of many loading stations to one of many delivery stations by the simple expedient of setting up the integral control means at the loading station with the carrier thereafter automatically moving to the desired delivery station.

A carrier unit of this type is normally adapted to move over one or more stationary guide rails in the form of tracks. The unit may include a self-powered drive roller in frictional contact with the track or guide rail and a load-support platform. While some systems incorporate a single, central guide rail or track and incorporate feed tracks at right angles thereto, the use of a "main line system" of this type severely limits the number of moving package units which may be operated concurrently. One reason why so many of the systems in current use utilize the main line principle is the fact that systems employing a great number of separate lines must of necessity include a relatively large number of switches to enable the conveyor package units to be transferred readily from one line to the other in a simple and fault-free manner. In a "multiline" system, one of the principle limiting features, therefore, becomes the physical size of the switches which in turn is determined by the size of the load carrier unit.

In order to reduce the over-all size of the package unit and to keep the unit as compact as possible, it has been found advantageous to use a single support means of the pendent type for supporting the load platform at a point spaced below the friction drive means and control mechanism of the unit. In a preferred form, the pendent support arrangement takes the form of one or more pipes or hangers which are pivotably coupled to the depending portion of the main supporting base. It is readily apparent that the pivotable coupling arrangement allows the support platform to pivot or oscillate slightly about the pivot point in response to velocity changes of the moving package, such as during acceleration, deceleration, and possibly during switching.

Since automatic sortation and conveying systems of this type carry articles of varying size and weight, the inertial effects on the carrier unit and the load itself vary considerably. For example, if a high-speed package of some mass is brought to a sudden stop, the inertial effects could cause the pivotable load-support platform to oscillate to an extent causing damage to the load and/or the conveying mechanism.

It is, therefore, a primary object of this invention to provide an improved inertial dampening mechanism for use with a high-speed conveyor system employing a pivotable, pendent-mounted support platform for supporting a load with respect to a moving carrier unit in spaced relation thereto.

It is a further object of this invention to provide an improved inertial dampening mechanism for a conveyor system of this type in which the braking force varies with the weight of the load carried thereby.

It is a further object of this invention to provide an improved inertial dampening mechanism for a conveyor system of this type in which the dampening mechanism is completely mechanical with pure frictional braking being effected between relatively movable members.

It is a further object of this invention to provide a frictional dampening mechanism for a conveyor system of this type which is of simplified construction, dependable in use, and is capable of being manufactured at low cost.

It is a further object of this invention to provide an improved inertial dampening mechanism of this type which takes up but a minimum of space in a lateral direction while allowing the unitary control, drive and support package to be as compact as possible.

Other objects of this invention will be pointed out in the following detailed description and claims and illustrated in the accompanying drawing which discloses, by way of example, the principle of this invention and the best mode which has been contemplated of applying that principle.

In the drawing:

FIG. 1 is a perspective view of the unitary, compact, movable conveyor load carrier unit incorporating self-driving means, a control mechanism, and a pivotable support for a depending load platform incorporating the inertial dampening mechanism of the present invention.

FIG. 2 is an exploded, perspective view of the inertial dampening mechanism forming a portion of the apparatus of FIG. 1.

In general, the apparatus of this invention includes a stationary, generally horizontal guide rail which acts to support by means of a frictionally driven drive roller, a unitary self-driven conveyor carrier unit including a longitudinally extending base to which is coupled the support means for the drive roller and a drive motor for driving the same. The base member may also include a control mechanism for controlling the path of the self-driven unit along the system. A depending bail is fixed to the base member and has a rigid bail hanger extending downwardly therefrom. A horizontal load-support platform includes at least one upstanding pipe or hanger which is pivotably coupled to the depending bail hanger. Opposed friction surfaces are connected respectively to the depending bail hanger and the upstanding pipe hanger. Means responsive to the weight of the load on the platform increase the pressure between the opposed frictional surfaces.

In one specific embodiment, the pivotable connection between the bail hanger and the hanger plate, formed by the upper end of the hanger pipe, is such that the members are allowed limited freedom to move vertically with respect each other. Opposed, axially aligned, diverging, conical depressions are formed within respective abutting portions associated with these members, and a ball bearing is positioned therein, such that an increase in the load will cause the hanger plate coupled thereto to move downwardly to effect axial displacement of the opposed conical depressions tending to move the ball laterally out of one of the depressions, laterally displacing the members and increasing the pressure between the opposed friction surfaces.

Referring to the drawing, there is shown in FIG. 1, a highly compact, self-powered carrier unit which is adapted for use in a multiline conveyor system employing a great number of closely spaced switches. The unit 10 is supported for longitudinal movement on a U-shaped metal guide rail 12 by means of roller 14 which is positioned so as to make peripheral contact on either or both opposed surfaces 16 of rail member 12. The unit 10 includes a base portion 18 which is L-shaped in configuration and formed of conventional metal stock. The roller 14 is coupled to base 18 by conventional coupling mechanism 20, which acts as a bearing for the transverse shaft 22. On the outer end of shaft 22 is positioned a relatively large pulley 24 which provides a means for driving roller 14 in response to energization of electrical motor 26, the motor 26 being coupled to pulley 24 by the drive belt 28 and motor pulley 30. The motor 26 is pivotably coupled to the base member 18 at 32 so that the weight of the motor 26 provides tension for the belt drive. A suitable control mechanism 34 which may include physically displaceable pins 36 is provided for setting up the specific delivery station to which the carrier moves after being loaded at one of the loading stations.

In order to keep the unitary carrier as compact as possible, the present system makes use of a generally U-shaped bail 38 which may be formed of sheet or cast metal stock and includes side portions 40 and a horizontal base portion 42. The U-shaped bail may be coupled to the base member 18 by suitable bolts 44 at the upper end thereof and may be adapted for limited pivotable movement with respect to base 18 about an axis provided by the coupling bolts 44. The U-shaped bail 38 includes a downwardly depending portion or bail hanger 46 which may be welded to the base 42 of the bail or formed integrally therewith. The bail hanger 46 is in the form of a thin, rectangular plate and includes central stud 48 which extends laterally from one face thereof. The stud includes a threaded bore 50. A load-supporting platform indicated at 52, is of conventional construction and includes a pair of opposed end plates 54, a base 56, and a closed side wall 58, these elements acting to form a compartment for receiving the load which may take the form of letters, or packages, if used in a post office sortation system, or individual manufactured articles if utilized in industrial applications. An upstanding pipe member 60 is rigidly coupled by means of welded flanges 62 to a longitudinally extending ridge 64 formed integrally with the upper end of the platform wall 58. A hanger plate 66, which is formed of sheet metal and of the same configuration as the bail hanger 46, is rigidly coupled to the upper end of the pipe 60 by conventional means, such as by welding thereto. The hanger plate 66 includes a central bore 68 which is of a diameter somewhat larger than stud 48 thereby allowing the load-support platform 52 to be pivotally supported with respect to the remaining portions of the unitary load carrier and more specifically with respect to the depending bail hanger assembly 46. Therefore, as a result of inertial forces exerted on the load-support member 52 or the load carried thereby, the pipe hanger 60 and its associated elements will pivot with respect to the bail hanger assembly about an axis formed by stud 48.

In order to prevent damage to the load carried by the load-support member 52, as well as to the unitary carrier package 10, the present invention is directed to an improved, inertial dampening mechanism of the mechanically operated, friction type for restraining pivotable movement of these two members with respect to each other as a result of inertial forces set up within the system. A plurality of identically formed friction discs 70 and 70' formed of relatively thin metal stock and including central apertures 72 are mounted in abutting relation on stud 48 between the hanger plate 66 and the bail hanger 46. A second stud 76 of slightly less diameter than stud 48 is secured to the surface of the bail hanger 46 and projects outwardly from the bail hanger in the same manner as stud 48 but is spaced slightly therefrom along the vertical axis of the bail hanger. A third stud 78 of the same diameter as stud 76 is coupled to the inner surface of the hanger plate 66 and extends therefrom, being vertically aligned with both studs 48 and 76. It is to be noted that each of the discs 70 and 70' include projecting portions 80 forming a recess or notch 82 therebetween, with the recesses 82 of alternate discs 70 being co-aligned respectively with stud 76 attached to the bail hanger 46 and recesses 82 of alternate discs 70' being co-aligned with stud 78 attached to the hanger plate 66. Thus, with the hanger plate 66 mounted on stud 48 for rotation thereabout, the discs 70 will be prevented from freely rotating about the stud 48 since stud 76 engages notches 82 of these disc elements.

Since the bail hanger assembly is relatively fixed, the discs 70 will not rotate at all. However, with respect to the discs 70', since their respective notches 82 engage stud 78, rotation of platform 52 and hanger plate 66 will cause a like rotation of the respective braking discs 70' about the axis of stud 48.

If force is exerted along the axis of the discs, the frictional engagement of the respective discs 70 and 70' will retard pivotable movement of the load-support member 52 with respect to the remaining portion of the conveyor depending primarily upon the amount of force exerted on the abutting friction surfaces of the braking discs. The frictional force varies automatically in accordance with the weight of the load supported by the load-support member 52. It is important to note that the diameter of the apertures 72 within the braking discs is slightly greater than the diameter of stud 48 upon which they are positioned. However, with respect to the hanger plate 66, the diameter of aperture 68 is in the order of one and one-half the diameter of stud 48. Thus, there is some limited movement between member 66 and the bail hanger 46 as a result of the loose fit between these members. After the braking discs 70 and 70' have been positioned properly upon stud 48 with stud 76 within respective notches 82 of discs 70, the hanger plate 66 may be positioned upon the stud by allowing the stud 48 to project through aperture 68. Of course, stud 78 must be aligned with recesses 82 of brake discs 70'.

The variable braking force is partially achieved by the provision of one or more sets of opposed, diverging, conical depressions 84 and 86 formed on the outer surface of hanger plate 66 and a surface of an end plate 88, respectively. The end plate 88 is adapted to fit flush to the outer surface of hanger plate 66 and with the elements in this position, a ball bearing member 90 of a diameter slightly less than the diameter of the conical depressions 84 and 86 is captured and held within the opposed, diverging, conical depressions, which at no load are axially aligned. An end washer 92 is frictionally coupled to the outer surface of the end plate and the damping mechanism is held in assembled position by the use of a conventional screw 94 and an intervening lock washer 96, the screw 94 being threadably received by aperture 50 of the stud 48.

The operation of the inertial dampening mechanism is readily apparent from viewing FIG. 2. Depending upon the weight of the load carried by the horizontal load-support member 52, the hanger plate 66 will be pulled downwardly to a greater or lesser extent. The amount of vertical movement of the hanger plate 66 and the elements it is supporting with respect to the bail hanger 46 is limited by the difference in diameter of bore 68 and the diameter of stud 48. Any relative movement of the hanger plate 66 and the bail hanger assembly 46, including end plate 88, will result in causing a ball 90 to tend to move out of one of its associated conical depressions 84 or 86, which must of necessity effect a lateral movement of the hanger plate 66 with respect to the bail hanger 46. The lateral movement of the hanger plate 66, which can only be towards the bail hanger 46 results in an increase in the force exerted between the frictional surfaces of the braking discs 70 and 70'. Therefore, depending upon the amount of load carried by the horizontal load-carrying support member 52, there will be a greater or lesser dampening of inertial movement of the hanger plate 66, the pipe 60, the load-support member 52, and the load about the axis of stud 48. In this way, regardless of the amount of load carried by the load-support 52, within limits, the actual pivotable movement of this member will remain essentially the same, since for a greater load, there is greater frictional resistance.

It is to be noted that the provision of a pair of opposed, diverging, conical depressions 84 and 86 above and below the location of stud 48 is only indicative of one form that the present invention may take. The same effect could be achieved by the use of a single pair of opposed, diverging, conical depressions. While in the preferred configuration the depressions are conical, the configuration could take other forms, such as ovoidal, etc. Also, while the individual braking discs 70 and 70' are shown to be flattened, they could be slightly curved to effect a natural resilience. In this way, for a greater load and a greater lateral deflection of the hanger plate 66 with respect to the bail hanger 46, more surface area of the adjacent braking discs would be contacted.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. An improved dampening mechanism for use with a conveyor system employing a high-speed load carrier adapted for movement along a horizontal guide rail including: a base member, means supporting said base member from said guide rail, a horizontal load-support platform, means for pivotably hanging said platform from said movable base member, said dampening mechanism comprising: opposed friction surfaces connected respectively to said movable base member and said hanging means and means responsive to the weight of load on said platform for varying the pressure between said opposed friction surfaces.

2. An improved dampening mechanism for use with a conveyor system employing a high-speed load carrier adapted for movement along a horizontal guide rail including; a base member, means supporting said base member from said guide rail, a horizontal load-support platform, pendent mounting means for pivotably connecting said platform to said movable base member but spaced therefrom, said dampening mechanism comprising: opposed friction surfaces connected respectively to said movable base member and said pendent mounting means about said pivot connection and means responsive to the weight of said load on said platform for effecting lateral movement of said pendent support member relative to said base member to vary the pressure between said opposed friction surfaces.

3. An improved dampening mechanism for use with a high-speed conveyor system employing a load carrier adapted for movement along a horizontal guide rail including; a base member, means supporting said base member from said guide rail, said base member having a rigid bail hanger depending therefrom, a horizontal load-support platform, pendent support means fixed to said load-support platform and extending upwardly therefrom, means for pivotably connecting said bail hanger and the free end of said pendent support means about an axis at right angles to the longitudinal axis of said load-support platform, said dampening mechanism comprising: opposed friction surfaces connected respectively to said depending bail hanger, and the free end of said pendent support means, and means responsive to the weight of said load on said platform for causing said pendent support means to move laterally relative to said depending bail hanger to vary the pressure between said opposed friction surfaces.

4. Apparatus as claimed in claim 3 wherein said opposed friction surfaces include a plurality of thin, friction discs, said discs positioned between said pendent support means and said depending bail hanger coaxially of said pivot connecting means with respective faces in frictional contact with each other, means for preventing alternate ones of said discs from rotating about said pivot axis while allowing the other discs to freely pivot about said axis in response to pivoting of said pendent support member.

5. Apparatus as claimed in claim 4 further including opposed, diverging, conical depressions formed within respective abutting portions of said bail hanger and said pendent support means, a ball bearing of a diameter slightly less than the diameter of said conical depressions being positioned within said depressions and held captive therebetween, and means responsive to the load on said horizontal load-support platform for effecting axial displacement of said opposed depressions whereby said ball tends to move laterally out of one of said depressions to effect lateral displacement of said pendent support member with respect to said bail hanger thereby increasing the pressure between the opposed friction surfaces of said respective disc members.

6. An improved dampening mechanism for use with a high-speed conveyor system employing a load carrier adapted for movement along a horizontal guide rail including; a base member, means supporting said base member from said guide rail, a horizontal load-support platform, pendent support means fixed to said load-support platform, extending upwardly therefrom, and terminating in a flat hanger plate, said base member including a depending bail hanger in the form of a flat plate, means including a stud extending at right angles from said bail hanger and an over-sized aperture formed within said hanger plate for pivotably supporting said load-support platform below said movable base member, said dampening mechanism comprising: a plurality of thin, metal friction discs each having a central aperture slidably mounted on said stud between said bail hanger and said hanger plate, means for preventing rotary movement of alternate ones of said discs about said stud while allowing the remaining ones of said discs to pivot about said stud in response to pivotable movement of said hanger plate, said stud extending through said aperture of said hanger plate and having an end plate affixed thereto with surfaces abutting said hanger plate, at least one set of opposed, axially aligned, diverging, conical depressions formed within respective abutting portions of said hanger plate and said end plate, a ball bearing having a diameter slightly less than the diameter of said conical depressions positioned within the cavity formed by said aligned, conical depressions, said opposed, diverging, conical depressions being spaced from the axis of said stud and aligned vertically therewith whereby an increase in the load on said load-support platform acts to move said hanger plate downwardly with respect to said bail hanger to effect axial displacement of said opposed, conical depressions with said ball moving laterally out of one of said depressions to cause said hanger plate to move towards said bail hanger on said stud and to increase the pressure between opposed friction surfaces of said discs.

7. An improved dampening mechanism for use with a conveyor system employing a high-speed load carrier adapted for movement along a horizontal guide rail including; a base having a depending bail member, means supporting said base member from said guide rail, a horizontal load-support platform, a pendent support member coupled to said platform and extending upwardly therefrom, means including a stud extending inwardly from one of said members and a cooperating over-large aperture formed within said other member for pivotably connecting said platform to said base member, a plurality of annular, thin, friction discs positioned on said stud between said members, and means responsive to the weight of said load on said platform for varying the pressure between opposed friction surfaces on said disc members.

8. Apparatus as claimed in claim 7 wherein said disc members include areas of irregular configuration and means associated with said bail hanger member for preventing rotation of alternate ones of said discs about said stud member and means associated with said hanger plate and extending therefrom adapted to intersect said irregular surfaces formed on said other alternate ones of said discs to cause rotation with said hanger plate in response to the inertial force of said platform.

9. Apparatus as claimed in claim 8 wherein said stud extends through said aperture and has an annular end plate rigidly coupled thereto, at least one set of opposed, axially aligned, diverging, conical depressions formed within respective abuttting portion of said members, said depressions being formed at a point spaced from the axis of said stud and generally aligned vertically with said load-support platform, a ball bearing of a diameter slightly less than the diameter of said conical depressions positioned within said opposed depressions and captured thereby whereby an increase in load on said horizontal load-support platform acts to move one of said members downwardly with respect to said other member to effect axial displacement of said opposed, conical depressions and movement of said ball bearing out of one of the depressions to effect lateral displacement of said one member with respect to said other member to increase the pressure between opposed surfaces of said friction discs.

10. In a high-speed conveyor system employing a load carrier adapted for movement along a horizontal guide rail including; a base member, means supporting said base member from said guide rail, a horizontal load-support platform, means for pivotably connecting said platform to and below said movable base member, the improvement comprising: an improved inertial dampening mechanism including, opposed friction surfaces connected respectively to said movable base member and said horizontal platform and means responsive to the weight of said load on said platform for varying the pressure between said opposed friction surfaces.

11. In a high-speed conveyor system employing a load carrier adapted for movement along a horizontal guide rail including; a base member, means supporting said base member from said guide rail, a horizontal load-support platform, pendent support means fixed to said load-support platform, extending upwardly therefrom and terminating in a hanger plate, said base member including a depending bail hanger, means including a first stud extending at right angles from said bail hanger and an oversized aperture formed within said hanger plate for pivotably supporting said load-support platform below said movable base member, the improvement comprising: a dampening mechanism including, a plurality of thin, metal friction discs each having a central aperture for slidably mounting said discs on said stud between said bail hanger and said hanger plate, means for preventing rotary movement of alternate ones of said discs about said stud while allowing the remaining ones of said discs to pivot about said stud in response to pivotable movement of said hanger plate, said stud extending through said aperture in said hanger plate and having an end plate affixed thereto with surfaces abutting said hanger plate, at least one set of opposed, axially aligned, diverging, conical depressions formed within respective abutting portions of said hanger plate and said end plate, a ball bearing having a diameter slightly less than the diameter of said conical depressions positioned within the cavity formed by said aligned, conical depressions, said conical depressions being spaced from the axis of said stud and aligned vertically therewith whereby an increase in said load on said load-support platform acts to move said hanger plate downwardly with respect to said bail hanger to effect axial displacement of said opposed, conical depressions with said ball moving laterally out of one of said depressions to cause said hanger plate to move towards said bail hanger on said stud and to increase the pressure between opposed friction surfaces of said discs.

References Cited in the file of this patent
UNITED STATES PATENTS

| | | |
|---|---|---|
| 1,867,678 | Rayburn | July 19, 1932 |
| 2,608,163 | Martin | Aug. 26, 1952 |
| 2,608,164 | Johnston | Aug. 26, 1952 |